No. 655,270. Patented Aug. 7, 1900.
T. O. PERRY.
WIND WHEEL.
(Application filed Jan. 3, 1898.)
(No Model.) 5 Sheets—Sheet 1.
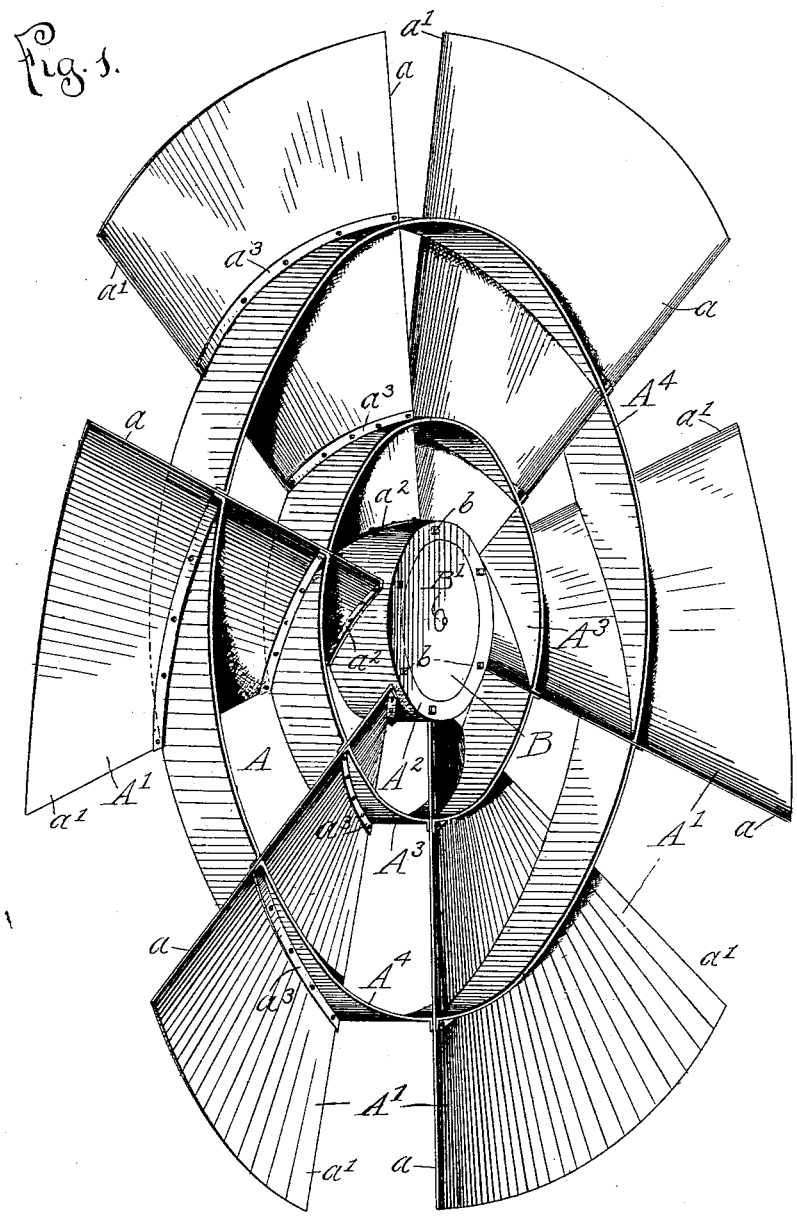

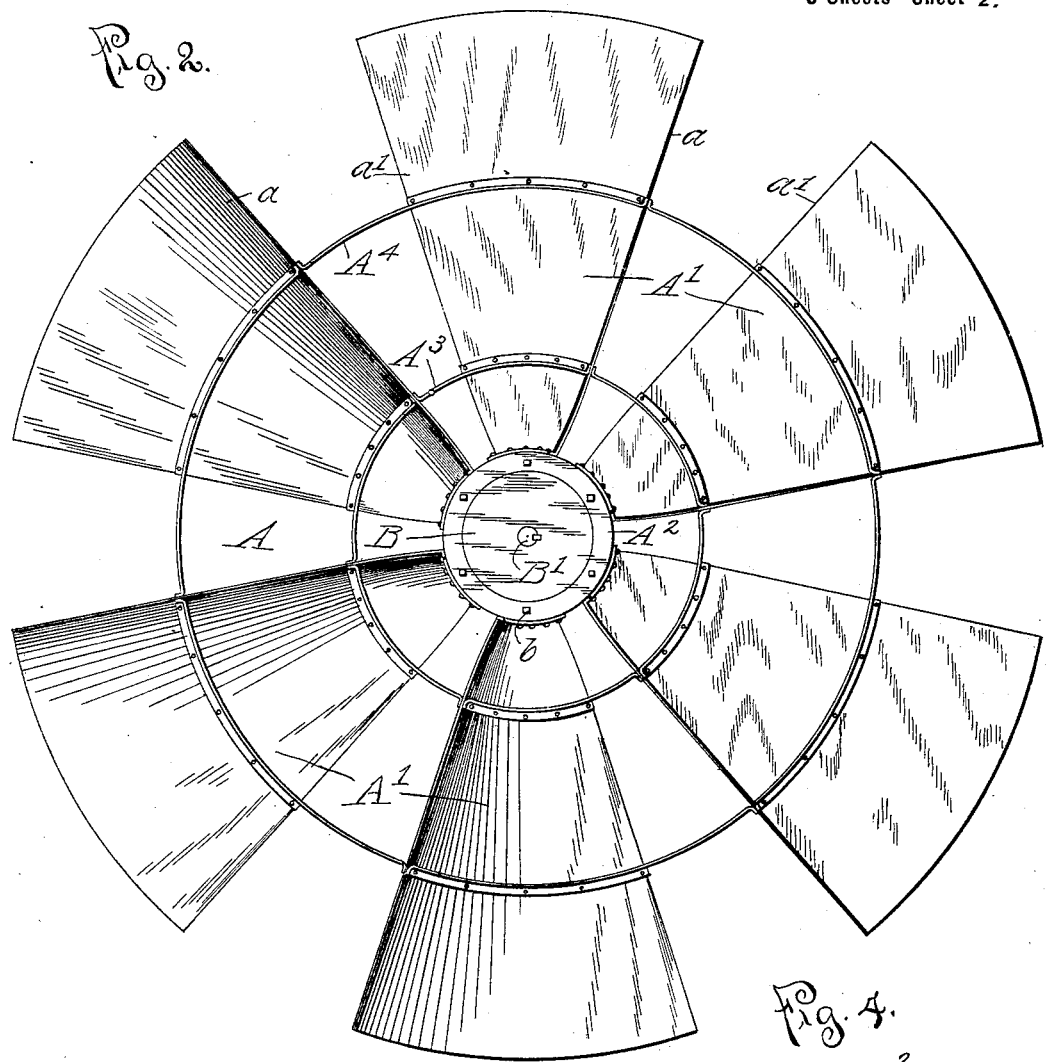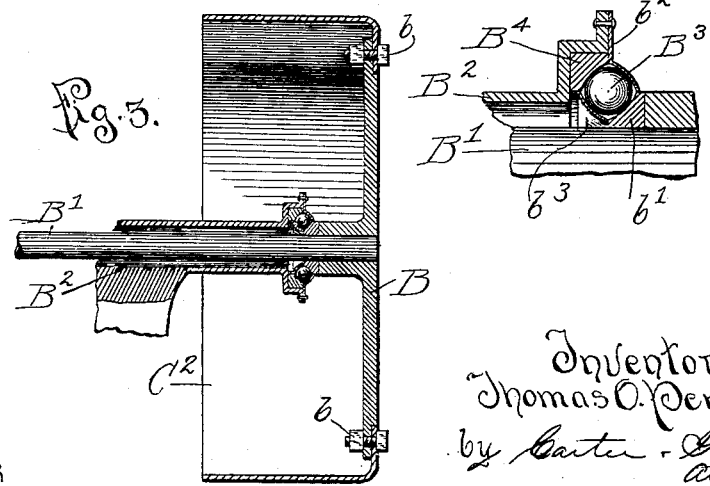

No. 655,270. Patented Aug. 7, 1900.
T. O. PERRY.
WIND WHEEL.
(Application filed Jan. 3, 1898.)

(No Model.) 5 Sheets—Sheet 3.

Witnesses:
J. B. Keir
A. L. McElroy

Inventor,
Thomas O. Perry.
by Carter & Graves

No. 655,270. Patented Aug. 7, 1900.
T. O. PERRY.
WIND WHEEL.
(Application filed Jan. 3, 1898.)

(No Model.) 5 Sheets—Sheet 4.

Witnesses:
J B Weir
A L McElroy

Inventor
Thomas O. Perry.
by Carter + Graves
Attys.

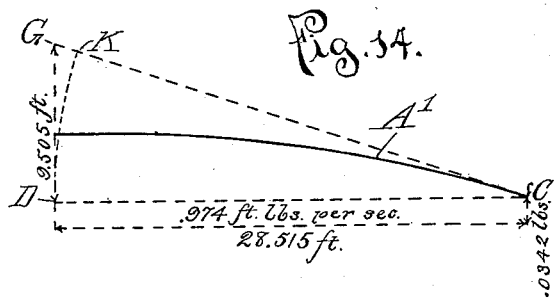
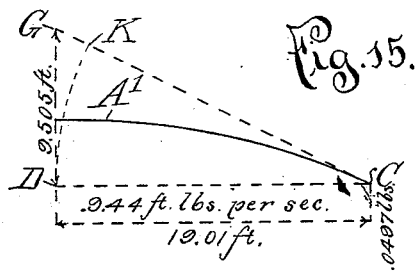
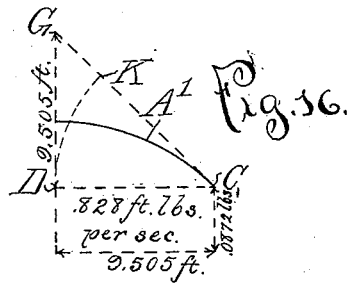
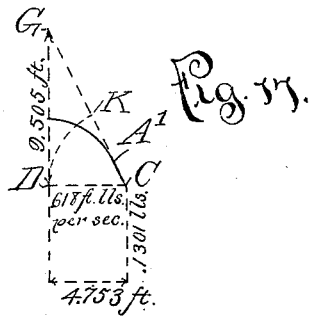

UNITED STATES PATENT OFFICE.

THOMAS O. PERRY, OF CHICAGO, ILLINOIS.

WIND-WHEEL.

SPECIFICATION forming part of Letters Patent No. 655,270, dated August 7, 1900.

Application filed January 3, 1898. Serial No. 665,342. (No model.)

*To all whom it may concern:*

Be it known that I, THOMAS O. PERRY, of Chicago, in the county of Cook and State of Illinois, have invented certain new and useful Improvements in Wind-Wheels, of which the following is a specification.

This invention relates to improvements in wind-wheels, and has for a principal object to provide a novel construction which will achieve a marked increase in the mechanical efficiency of devices of this character.

Other objects of the invention are to increase the simplicity and decrease the cost of manufacture by requiring fewer parts of simpler construction and less weight for necessary strength than in any form of wind-wheel heretofore known.

The invention consists in the matters hereinafter set forth, and particularly pointed out in the appended claims.

Figure 5:
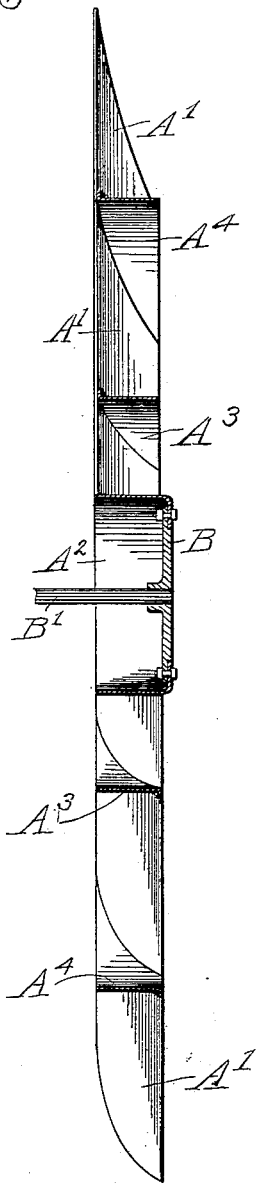
Figure 6:
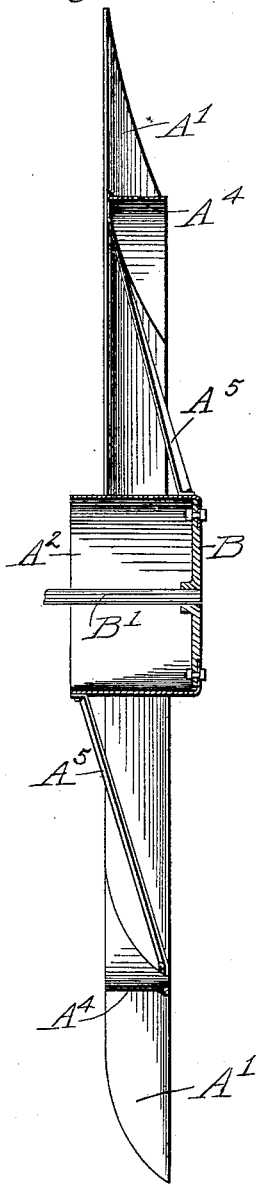
Figure 7:
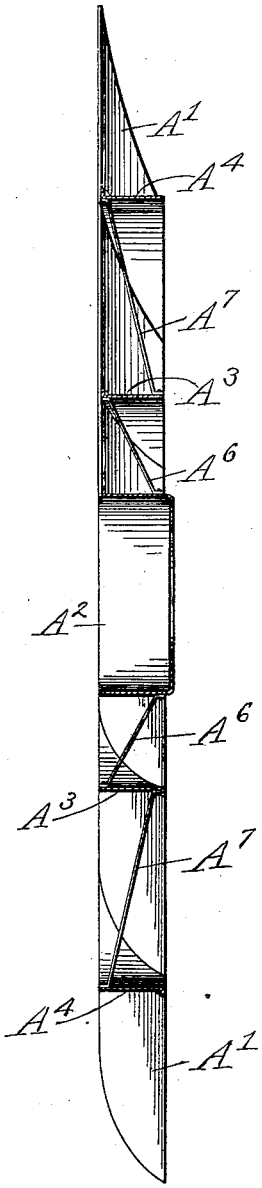
Figure 8:
Figure 9:
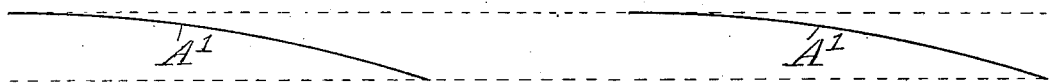
Figure 10:
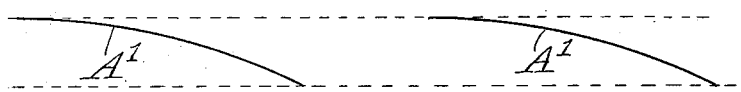
Figure 11:
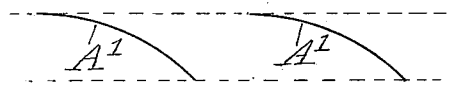
Figure 12:
Figure 13:
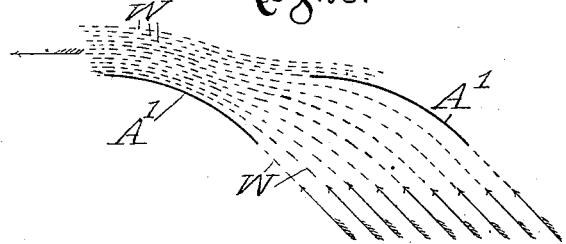

In the accompanying drawings, Figure 1 is a perspective view of a wind-wheel embodying my invention in one form. Fig. 2 is a front elevation thereof. Fig. 3 is an axial section of the hub and bearing. Fig. 4 is an enlarged detail of the bearing. Fig. 5 is a sectional side elevation of the wheel. Figs. 6 and 7 are similar views showing methods of bracing the wheel. Fig. 8 is a perspective detail of a segment of one of the annular supporting-bands. Figs. 9, 10, 11, and 12 are diagrammatic views showing the curvature and relative relation of each two adjacent sails at the perimeter, the outer band, the inner band, and the hub, respectively. Fig. 13 is a diagrammatic view showing the manner in which the air-currents act on the sails and are deflected thereby. Figs. 14, 15, 16, and 17 are diagrams showing the theoretical power and efficiency of the sail at different distances from the center of the wheel.

As shown in said drawings, A designates the wind-wheel as a whole, A' its sails, and $A^2$ its hub, to which said sails are directly secured. Said hub is cylindric in form and is herein shown as detachably secured to a spider or disk B, which is keyed or otherwise fixed upon a supporting-shaft B'. Desirably and in this instance the hub is made of seamless tubing and is flanged inwardly at its front end by spinning, swaging, or otherwise to fit concentrically over the perimeter of the disk or spider, being detachably secured thereto by bolts $b$, so that the wheel may be removed from its shaft without disturbing the key which locks the spider upon the latter.

In the approved construction shown the sails A' are six in number, and their size is made such that they approximately cover two-thirds of the entire circular area of the wheel, the other third of the area remaining in equal spaces between the sails for the passage of the air-currents. The actual length of the outer margin of each sail is to this end made approximately one-ninth of the outer circumference of the wheel, and in this instance, where the diameter of the hub is one-sixth of the diameter of the wheel, the length of the inner margin of each sail is desirably made approximately one-sixth of the circumference of said hub. The converging leading and trailing edges $a$ and $a'$ of all the sails are furthermore herein shown as located in two parallel planes, so that the depth of the wheel from front to rear is the same from its hub to its outer periphery. The inner end of each sail is shaped to closely fit against the surface of the cylindric hub and is rigidly secured to the hub, as by being flanged over and bolted or riveted thereto, as shown $a^2$ in Figs. 1 and 2.

Aside from their connection with the hub of the wheel the sails are supported in position by one or more thin and broad cylindric bands $A^3$ and $A^4$, each arranged concentric with the axis of the wheel and herein shown as consisting of a plurality of cylindric segments made of the exact size and shape to fit accurately between each two adjacent sails. Flanges $a^3$ are turned up at the margins of the segments where they meet the sails, and the proximate ends of each two segments are then secured to the intervening sail and to each other by rivets or the like extending through said flanges and sail. As herein shown, two such cylindric bands $A^3$ and $A^4$ are provided and are located approximately at one-third and two-thirds, respectively, of the radius from the center of the wheel, and this construction will probably suffice for wheels up to about twelve feet in diameter; but it will of course be understood that a greater number of such bands may be provided, if service so demands, while in the smaller sizes a single such band may suffice. Outside of the outer band the stiffness of the sails depends upon their curved form and upon the rigidity and length of their juncture with said bands, the latter being herein shown as made of a width just equal to the full depth of the sails measured in a direction parallel to the axis of the wheel, so that the sails are supported from edge to edge by the segments. This stiffness is increased by the flanges at the ends of the segments and between which the sails are clamped, and the fact that said sails are not weakened by any perforations larger than the rivet-holes is also of great importance in this connection. The curvature and angular arrangement of the sails in this form of construction may obviously be made anything desired, so far as concerns any necessities of the structural situation, whereas in the more modern of the wind-wheels heretofore designed the angle of the sails has been limited in practice by the fashion of passing an annular connecting-band through them, so that they would be largely cut away and dangerously weakened by such band if placed at too flat an angle with relation thereto. The increased efficiency of the improved wheel herein shown is largely dependent upon the fact that it is designed to normally run and to work most efficiently at a much higher velocity of rotation than has been heretofore usually practiced, and to this end its sails at their forward edges are made quite flat, being formed upon curves, such and so arranged that their forward edges are parallel to the relative direction of the wind with respect to the sails when the wheel is running at normal speed and their rear edges parallel, or nearly so, to the plane of rotation of the wheel. This curvature of the sails is graphically illustrated in Figs. 9 to 12, inclusive, which represent the developed cylindric cross-sections of two adjacent sails, taken, respectively, at their outer ends, at the outer cylindric band, at the inner cylindric band, and at the hub, the corresponding distances from the center being in the particular wheel herein shown, respectively, the full radius, two-thirds the radius, one-third the radius, and one-sixth the radius. The curvature shown at the first three distances mentioned is exactly that above described—i. e., the forward end of the curve is parallel to the relative direction of the wind with respect to the sail when in motion and the rear end of the curve is shown parallel to the plane of rotation of the wheel. In Fig. 12 this theoretically-perfect arrangement is departed from in the latter respect, since the close proximity of the sails to each other at the hub renders it desirable to set back their rear edges at this point in order that the air may pass more freely between them.

The sails described are made of very thin material, desirably of hard-rolled sheet-steel, which is also suitable for the cylindric bands, and the thickness of which may be so slight that both the sails and the bands practically present knife-edges to the wind. Such thickness I have found need not exceed about one twelve-hundredth of the radius of the wheel in order that it shall exceed in strength and in its capacity to resist the violence of storms any of the wind-wheels now in common use. This proportion would call for steel of approximately one-sixteenth of an inch in thickness for a wheel twelve feet in diameter or of one thirty-second of an inch for a wheel six feet in diameter. The entire wheel, as shown, omitting the shaft and spider, comprises only nineteen pieces, which when riveted together in the manner described form practically one rigid piece without any of the appendages such as are commonly designated by the terms "arms" and "braces" and which must always obstruct to a greater or less degree the free flow of air between the sails.

The reasons for the superior efficiency of the construction described and the importance of doing away with every possible resistance to the free flow of air between the sails, however small it may be and whether caused by the presence of arms or braces or otherwise, will be more fully understood from the following discussion of the manner in which the wind acts on the sails of a wind-wheel to drive the latter, considered both from a theoretical standpoint and in the light of some of the dynamometric tests made by me in the course of a long series of experiments with a large number of different wind-wheels.

The office of the sails of the windmill is to absorb the energy of the wind, and they accomplish this by changing the direction of the wind and reducing its actual velocity, so that if perfect efficiency could be obtained the wind would be entirely robbed of its velocity and split from the trailing edges of the sails as absolutely dead air. Such ideal result is most nearly approximated in practice by changing the direction of the wind so that on leaving the sail its motion is in a direction substantially opposite to the motion of the sail and by reducing its velocity as nearly as practicable to the lowest point at which it will flow out of and free itself from the sail. To meet these conditions, the speed of the sail relatively to the wind must be high, and the sail itself toward its outer extremity must be relatively flat at its leading edge, since in order that it may receive the wind with the least possible friction and disturbance its leading or receiving edge must be parallel with the direction in which the wind meets the sail when the wheel is rotating at normal speed, so that if a high relative sail velocity is determined upon the front edge of the sail must be arranged at a correspondingly-flat angle with respect to the plane of rotation. Owing, however, to the radial arrangement of the sails and to the decreased velocity of the parts nearer the center of rotation this angle will not be constant, but will increase from the outer end of the sail to the hub and will become much greater as it approaches the latter, as is illustrated in Figs. 9 to 12, inclusive, which in this construction and as before stated represent the angular arrangement and curvature of the sails at distances from the center corresponding, respectively, to the full radius, two-thirds the radius, one-third the radius, and one-sixth the radius, and at which distances the sail velocity is designed to be respectively three times, twice, equal to, and one-half the velocity of the wind. The trailing edges of the sails must be approximately parallel to said plane of rotation in order to change the direction of the wind in the manner above stated. This rule would need no modification if it were not for the fact that in a wind-wheel one sail necessarily follows closely after another, so that near the hub it is found advantageous to slant the sail back slightly at its trailing edge, as shown in Fig. 12, in order that the space between the sails may not be too much choked at this point. Between its leading and trailing edges the contour of the sail should be a smooth curve without abrupt changes, so that the air may flow along its surface with as little resistance as possible.

The terms "leading edge" and "trailing edge" are used throughout the specification and claims to indicate the extreme marginal faces of the sails, as though the sails were surfaces without thickness.

The flow of air along the back of the sail should be as smooth and uninterrupted as along its front, since the back of the sail plays an important part in directing the course of the air-currents which tend to cling to and follow it, as any one may determine experimentally by observing the flow of a steam-jet along a curved surface held in its path. In fact, it is largely due to this suction between the air-currents and the backs of the sails that the entire body of wind intercepted by the wheel will escape from between the sails in a direction approximately opposite to their direction of rotation. The backs of the sails must, therefore, also curve smoothly from their front to their rear edges, as will be the case when the sails are made of thin sheet metal without obstructing arms, braces, or other obstacles, as described. The flow of air between such sails is graphically illustrated in Fig. 13, in which the dotted lines W represent the wind-currents and the curved lines A' A' the cross-section of two sails assumed to be moving at normal speed. The direction of the lines W at their inception and as marked by the arrows represents the relative direction of the wind with respect to the moving sails, assuming that the plane of rotation of the sails is perpendicular to the actual direction of the wind, and the curvature of said lines indicates the deflection incident to their passage between the sails.

The effect of introducing material resisting edges or surfaces between the sails in the form of arms or braces or otherwise is to interrupt and disturb this free flow of the air-currents and to waste the energy of the wind in overcoming the friction and resistance of the air. As a practical illustration of this fact reference is had to the result of tests made with a wind-wheel having six sails similar in shape to those here shown, but in which each sail was supported by a slender radial rib extending along the center of its back. When this wheel was first tested, such supporting-ribs extended to the outer margins of the sails. Its speed was found to be slightly over thirty-eight revolutions per minute, and its power, in foot-pounds, of useful work was twenty-four per cent. greater than that of a compared standard wheel of the same size having for its sails numerous narrow wooden slats after a fashion which was then and still is a common practice. The extremities of the six supporting-ribs were then cut away as far as was possible without endangering the support of the sails and to an amount in each equal to seventeen-thirtieths of the radius of the wheel. Upon being again tested in the same velocity of wind, which could be artificially regulated as desired and under precisely the same conditions as to load, &c., the number of rotations per minute rose to between fifty-six and fifty-seven, and its power, in foot-pounds, was now found to be eighty-four per cent. greater than that of the narrow-slat wheel. Here was a gain in useful work of about forty-eight per cent., due entirely to the removal of the outer ends of said arms and to the consequent avoidance of the resistance which they had previously offered to the proper flow of the air-current. This matter will be made still clearer by considering the theoretical efficiency which might be obtained in a wind-wheel if all the air intercepted by the wheel could have its direction changed without clogging or friction, so as to escape from the rear edges of the sails in a direction opposite to their motion. In Figs. 14, 15, 16, and 17 the curved lines A' represent transverse sail-sections at the four previously-named radial distances and when constructed as required for maximum efficiency in accordance with the theory before stated and on the assumption that the outer extremity of the sail travels at three times the velocity of the wind. In each of said figures the line DG is taken to graphically represent the actual direction and velocity of the wind and the line CD the velocity of the sail at the point where the section is taken. This line CD under the conditions mentioned will therefore be three times as long as the line DG in Fig. 14 and but twice as long in Fig. 15. In Fig. 16 the lines DG and CD will be equal, while in Fig. 17 the line DG will be twice as long as the line CD. The line CG in each case may be said to represent the relative impinging direction and velocity of the wind with respect to the sail in motion, as well as its relative velocity at leaving in a direction opposite to the sail's motion, and the distance GK, which is the difference in length between lines CD and CG, will represent the actual velocity which the air retains after passing from the trailing edge of the sail. Now since the energy of any given quantity of wind at different velocities varies as the squares of the velocities, $DG^2$ may represent the total actual energy of wind before meeting the sail, and $GK^2$ the remaining energy of wind after acting on and leaving the sail, and $DG^2$ $GK^2$ will represent the efficiency of the sail, or the proportion of the total energy of the wind given up in its passage along the sail, those percentages being in the example given .974, .944, .828, and .618, respectively. The differences in these efficiencies or in the proportion of energy utilized at the different radial distances from the center are entirely due to the differences in sail velocity at those distances and clearly show how necessary high velocities are to good economy, and since a small resistance causes a great loss of energy at high velocity it is consequently of the greatest importance that the resistance due to the number and thickness of material edges shall be reduced to the lowest possible limit, as before stated. The same thing may be further demonstrated in a different manner by considering with regard to the four different radial distances what part of the work performed by a sail is due to that factor which represents the resultant effort or push of the impinging and escaping air-currents on the sail and what to that factor which represents sail velocity, it being obvious that since all work is the product of pressure into distance the work of a wind-wheel sail may also be representable by such an equation. According to the principles enunciated in Rankine's work on *The Steam Engine*, the resultant useful effort or push of the wind in the direction of the sail's motion may be represented by the lengths of the lines GK in diagrammatic views, Figs. 14 to 17, GK being, as before, the difference between the lines CD and CG. The sail movement in each case will be the line CD, and the product or useful work may therefore be represented by the rectangle erected on the line CD as a base with an altitude equal to the line GK.

Assuming, for example, a wind velocity of 9.505 feet per second, which is the velocity at which the energy per square foot of cross-section of wind-current will be approximately one foot-pound per second, the base-line CD will in the four figures be 28.55, 19.01, 9.505, and 4.753 feet per second, respectively, and the altitude .034, .0497, .0872, and 1.301 pounds, respectively, making the work done in each case .974, .944, .828, and .618 foot-pounds per second, respectively. With the wind velocities assumed these products will also represent efficiencies as well as work and will be found the same as the efficiencies hereinbefore given. The point to be especially noticed in this connection is the relation of useful effort to sail speed in each of the four cases, the higher speeds giving the greater work, although the resultant wind-push at these speeds is relatively smaller, and this shows how great may be the saving of energy at high speed by reducing resistances even by small amounts and how great is the importance of having especially the outer extremities of sails thin and self-supporting for as great a distance as possible without even the interposition of thin bands between them. This also shows why the leading edge of a sail should be tangent everywhere to the relative direction of the impinging wind, as otherwise some portion of the sail could not travel at the best speed for efficiency without back pressure at some other portion.

Theoretically perfect efficiency could be obtained only by infinite sail speed, at which the useful effort or push would be immeasurably small. It is evident that the resistance of the air itself against resisting edges would entirely neutralize the useful effort at much less than infinite velocity, and even with the assumed peripheral speed of three times the velocity of the wind the push factor of the work is so small as to make every possible saving in frictional resistance a matter of the greatest importance.

Wind-wheels of large size can also be made in the manner hereinbefore described and will be equally as strong as smaller ones in withstanding the violence of storms, providing that all the lineal dimensions, including the thickness of the stock employed, are made larger in proportion. This rule, however, makes the larger wheels comparatively very heavy, since their weights will vary as the cubes, and their power only as the squares, of their diameters. A large wheel would therefore weigh twice as much in proportion to its capacity as a wheel one-half its diameter, and it is for this reason that a gain in wind-wheel efficiency is so important, since it means much more than a mere corresponding increase in the work which a given size of wheel can perform, for to a proportionate extent it will avoid the necessity of enlarging wheels at a great relative sacrifice in the cost of materials. Thus it would take only half the material to do a given amount of work with four wind-wheels that would be required to do the same work with one wind-wheel of twice the diameter, and, if the efficiency of these wheels could be double, two of their number might obviously be dispensed with and the amount of necessary material cut in two again for the given amount of work, and while the advantages of dispensing with all arms or braces has been demonstrated it may sometimes be found desirable in constructing a very large wheel to make it of thinner material and supply the strength lost in this manner by a system of bracing, notwithstanding the loss of efficiency which may result. Thus in Figs.

6 and 7 I have shown two examples of braced wind-wheel structures, in each of which the perfect form and proportion of sails heretofore shown is retained subject to the added resistance of the braces. In Fig. 6 the inner annular band $A^3$ is omitted, and the sails are additionally secured to the hub by braces $A^5$, part of which are fastened at their inner ends to the front of the hub and at their outer ends to the rear edges of the sails, just within the outer annular band $A^4$, and part from the rear of the hub to the forward edges of the sails. In Fig. 7 an inner and outer annular series of braces $A^6$ and $A^7$, respectively, is shown in connection with both annular bands $A^3$ and $A^4$, the inner set of braces $A^6$ extending from the front of the hub to the rear edge of the inner annular band and the outer set of braces $A^7$ from the front edge of the inner annular band to the rear edge of the outer annular band.

In Figs. 14 to 17 the several lines CD are proportional to the radial distances in each case and the lines DG are all of the same length. Hence the tangents of the angles CGD or the cotangents of the angles of inclination with the plane of the wheel made by the leading edge of a sail at different radial distances are proportionate in length to the corresponding radial distances. This rule holds good whatever angle may be assumed for the leading edge of a sail at some one radial distance. Assuming that at the outer extremity of a sail the line CD is three times the length of DG, as shown in Fig. 14, then the angles CGD at six different points radially equidistant, commencing at the outer extremity and taken in the order of their radial distances, will be respectively about seventy-one degrees, sixty-eight degrees, sixty-three degrees, fifty-six degrees, forty-five degrees, and twenty-six degrees, from which it will be seen that the angles CGD decrease at a greater rate than the radial distances diminish and that the angular diminution becomes more and more rapid with regular approaches toward the center of the wheel. This also makes it apparent that in order to hold the corresponding sail curvature effectively the radial interval between the hub-band $A^2$ and the intermediate band $A^3$ should be less than the radial interval between the intermediate band $A^3$ and the outer band $A^4$.

I do not claim that the particular angles herein shown would be the best in all cases, but they serve well the purpose of illustration, nor do I confine myself to the particular number and proportions of sails and other parts herein shown.

The gearing or other connections between the wind-wheel and the mill or other mechanism to which it is applied or in connection with which it is used has no bearing on the present invention and is therefore not herein illustrated. It will be understood also that various changes in mechanical detail may be employed in the practical construction of wind-wheels without involving any departure from the principles of the invention which they may still essentially embody.

I claim as my invention—

1. In a wind-wheel, the combination with the shaft and hub fixed thereon, of a plurality of radial transversely-curved sails, and segments of thin cylindrical bands interposed transversely between the sails at radial intervals, each segment abutting against the front and back of adjoining sails in compound curves, and having their edges in contact with the sails turned outward at about right angles with the cylindrical band-surface forming exterior band-flanges, and rivets or bolts binding the sails between the band-flanges, substantially as herein set forth.

2. In a wind-wheel, the combination with the shaft, and hub fixed thereon, of a plurality of radial transversely-curved sails having their leading and trailing edges axially separated at both inner and outer ends by practically the same distance, and segments of thin cylindrical bands interposed transversely between the sails at radial intervals, each segment abutting against the front and back of adjoining sails in compound curves, and having their edges in contact with the sails turned outward at about right angles with the cylindrical band-surfaces forming exterior band-flanges, and rivets or bolts binding the sails between the band-flanges, substantially as herein set forth.

3. In a wind-wheel, the combination with the shaft and hub fixed thereon, of a plurality of radial transversely-curved sails having their leading and trailing edges axially separated at both their inner and outer ends by practically the same distance, their inclinations to plane of wheel decreasing along their leading edges with increasing radial distances while the inclination of their trailing edges remains practically a small constant angle throughout, and segments of thin cylindrical bands interposed transversely between the sails at radial intervals, each segment abutting against the front and back of adjoining sails in compound curves, and having their edges in contact with the sails turned outward at about right angles with the cylindrical band-surface forming exterior band-flanges, and rivets or bolts binding the sails between the band-flanges, substantially as herein set forth.

4. In a wind-wheel, the combination with the shaft and spider fixed thereon, of a broad cylindrical hub-band surrounding the spider and secured directly thereto, and a plurality of transversely-curved sails radiating from said hub-band and secured thereto in a junction-line of compound curvature traversing the cylindrical surface from front to rear at great angle with plane of wheel in front and small angle in the rear, and segments of cylindrical bands interposed transversely between the sails at distances intermediate of their length, each of said segments having flanged ends of compound curvature abutting respectively against the front and back of adjoining sails, and rivets or bolts binding each sail between the adjoining flanges of the cylindrical segments, substantially as herein set forth.

5. In a wind-wheel, the combination with the shaft and spider fixed thereon, of a broad cylindrical hub-band surrounding the spider and secured directly thereto, and a plurality of radial transversely-curved sails secured to said hub-band at their inner ends and having both their leading and their trailing edges from inner to outer ends approximately located respectively in two parallel planes axially separated and perpendicular to the shaft, and segments of cylindrical bands interposed transversely between the sails at distances intermediate of their length, each of said segments having flanged ends of compound curvature abutting respectively against the front and back of adjoining sails, and rivets or bolts binding each sail between the adjoining flanges of the cylindrical segments, substantially as herein set forth.

6. In a wind-wheel, the combination with the shaft and spider fixed thereon, of a broad cylindrical hub-band surrounding the spider and secured directly thereto, and a plurality of radial transversely-curved sails, their widths expanding with increase of radial distance, secured to said hub-band at their inner ends and having both their leading and their trailing edges from inner to outer ends approximately located respectively in two parallel planes axially separated and perpendicular to the shaft, and segments of cylindrical bands interposed transversely between the sails at distances intermediate of their length, each of said segments having flanged ends of compound curvature abutting respectively against the front and back of adjoining sails, and rivets or bolts binding each sail between the adjoining flanges of the cylindrical segments, substantially as herein set forth.

7. In a wind-wheel, in combination with the shaft and hub fixed thereon, and supporting concentric bands; the radiating sails curved transversely with respect to their radial length and expanding in width with increasing radial distance, each sail having a trailing edge approximately parallel with the plane of the wheel throughout its radial length, while its leading edge at different radial distances makes with a plane containing said leading edge and the axis of the wheel a varying angle diminishing with decrease of radial distance, and whose rate of diminution with radial approach to center of wheel exceeds the rate of said radial approach, substantially as herein set forth.

8. In a wind-wheel, in combination with the shaft and hub fixed thereon, and supporting concentric bands; the radiating sails curved transversely with respect to their radial length and expanding in width with increase of radial distance, each sail having a trailing edge approximately parallel with the plane of the wheel throughout its radial length, while its leading edge at different radial distances makes with the plane of the wheel various angles whose cotangents are approximately proportional to the various corresponding radial distances, substantially as herein set forth.

9. In a wind-wheel, in combination with the shaft and hub fixed thereon, and a broad hub-band secured around the hub; the radiating sails curved transversely with respect to their radial length and expanding in width with increasing radial distance and having trailing edges longitudinally and laterally approximately parallel with the plane of the wheel, and concentric bands supporting the sails at radial distances intermediate of their extremities, the axial depths of the sails at the hub-band equaling their axial depths at the intermediate supporting-bands, substantially as herein set forth.

10. In a wind-wheel, in combination with the shaft and hub fixed thereon, and supporting concentric bands; the radiating sails curved transversely with respect to their radial length and expanding in width with increasing radial distance, each sail having a trailing edge approximately parallel with the plane of the wheel throughout its radial length, while its leading edge, everywhere separated from the trailing edge by a practically-constant axial interval, at different radial distances makes with a plane including the leading edge and the axis of the wheel a varying angle diminishing with decrease of radial distance, and whose rate of diminution with radial approach to center of wheel exceeds the rate of said radial approach, substantially as herein set forth.

11. In a wind-wheel, the combination with thin radial sails transversely curved and secured at their inner ends to a broad central band or hub, of one or more thin and broad cylindrical concentric bands whose juncture with each of the sails forms a compound curve extending transversely across the width of the sail, the bands and sails being secured to each other by dividing into segments and flanging the bands along the sails and clamping the sails between the flanges of the band-segments by means of a plurality of rivets or bolts, substantially as herein set forth.

12. In a wind-wheel, the combination with thin radial sails transversely curved and secured at their inner ends to a central hub or band, of one or more thin and broad cylindrical concentric bands divided into segments with flanged ends, each segment joining the concave face of one sail with the convex back of the following sail, the line of each juncture of sail and band forming a compound curve extending transversely across the sail at a radial distance from the axis of the wheel intermediate between the ends of the sails, and rivets or bolts piercing the sails and clamping them between the abutting flanges of the segmental bands, substantially as herein set forth.

13. A wind-wheel comprising a hub, transversely-curved sails supported from said hub, one or more broad cylindric supporting-bands made of a plurality of thin segments with broad sides perpendicular to radial lines each inserted between two adjacent sails, flanges on the margins of said segments along the sails, and rivets or bolts uniting the proximate flanges of each two adjacent segments through the intervening sail, substantially as herein set forth.

14. A wind-wheel, comprising a spider fixed to a supporting-shaft, a tubular hub removably mounted upon the spider, sheet-metal sails transversely curved secured to said hub, one or more broad cylindric supporting-bands concentric with the hub and composed of a plurality of thin sheet-metal segments with broad sides perpendicular to radial lines each inserted between two adjacent sails and having flanges at their juncture with the sails, and rivets or bolts securing the adjacent flanges together through the intervening sail, substantially as herein set forth.

15. A wind-wheel comprising a broad cylindric hub, a plurality of transversely-curved sails supported from said hub at their inner ends, one or more broad cylindric connecting-bands concentric with the hub and consisting of segments, secured each between two adjacent sails, and braces axially inclined secured to the hub and to the farther side of each sail, for additionally supporting the latter, substantially as herein set forth.

16. A wind-wheel comprising a broad cylindric hub, sheet-metal sails transversely curved secured to the hub at their inner ends, one or more cylindric supporting-bands concentric with the hub and composed of separate sheet-metal segments inserted between the sails and secured to each other with the sails between them, and braces axially inclined secured to the hub and sails and extending from one end of the hub to the farther side of each sail for additionally supporting the latter, substantially as herein set forth.

17. In a wind-wheel, the combination with the supporting-shaft and a spider permanently fixed thereon, of a broad tubular hub-band inclosing the spider and removably bolted thereto, and transversely-curved sails radiating from and secured to the hub at their inner ends, the juncture of said sails with said hub-band forming a compound curve extending diagonally from front to rear of hub-band, substantially as herein set forth.

18. In a wind-wheel, the combination with the radial sails curved transversely with respect to their radial length and expanding in width with increase of radial distance and whose trailing edges make a small and practically-constant angle with the plane of the wheel throughout their radial length, and whose leading edges at different radial distances, make with the plane of the wheel various angles, which increase with uniform approach to center of wheel at a greater rate than the uniform rate of radial progression; of a broad cylindric hub-band securing the inner ends of the sails throughout their width, an outer concentric cylindric band extending axially across and securing the curvature of the sails along their junctions therewith, and an intermediate concentric cylindric band likewise securing the curvature of the sails across their intermediate widths, the radial interval between the hub-band and the intermediate band being less than the radial interval between the intermediate band and the outer band, substantially as herein set forth.

19. In a wind-wheel, the combination with the radial sails curved transversely with respect to their radial length and expanding in width with increase of radial distance and whose trailing edges make a small and practically-constant angle with the plane of the wheel throughout their radial length, and whose leading edges at different radial distances, make with the plane of the wheel various angles, which increase with uniform approach to center of wheel at a greater rate than the uniform rate of radial progression; of a succession of broad concentric cylindric bands extending axially across and securing the curvature of the sails across their widths along their junctures therewith, the radial interval between consecutive concentric bands near the center of wheel being less than between consecutive bands whose radial interval is more remote from the center, substantially as herein set forth.

20. In a wind-wheel, the combination with the radial sails curved transversely with respect to their radial length and expanding in width with increase of radial distance and whose trailing edges make a small and practically-constant angle with the plane of the wheel throughout their radial length, and whose leading edges at different radial distances, make with the plane of the wheel various angles, which increase with uniform approach to center of wheel at a greater rate than the uniform rate of radial progression; of a broad cylindric hub-band securing the inner ends of the sails throughout their width, an outer concentric cylindric band extending axially across and securing the curvature of the sails along their junctures therewith at a less radial distance than the outer extremities of said sails, and an intermediate concentric cylindric band likewise securing the curvature of the sails across their intermediate widths, the radial interval between the hub-band and the intermediate band being less than the radial interval between the intermediate band and the outer band, substantially as herein set forth.

In testimony that I claim the foregoing as my invention I affix my signature, in presence of two subscribing witnesses, this 28th day of December, A. D. 1897.

THOMAS O. PERRY.

Witnesses:
HENRY W. CARTER,
ALBERT H. GRAVES.